United States Patent Office 3,635,942
Patented Jan. 18, 1972

3,635,942
BASIC IONINOTRIAZOLE AZOINDOLE DYESTUFFS
Reinhard Mohr, Offenbach (Main), and Johann Ostermeier, Rembrucken, Germany, assignors to Farbwerke Hoechst Aktiengesellschaft vormals Meister Lucius & Bruning, Frankfurt am Main, Germany
No Drawing. Filed Feb. 10, 1969, Ser. No. 798,104
Claims priority, application Germany, Feb. 22, 1968, P 17 19 075.9
Int. Cl. C09b 29/00, 29/36; D06p 1/08
U.S. Cl. 260—157
6 Claims

ABSTRACT OF THE DISCLOSURE

Basic azo dyestuffs of the formula:

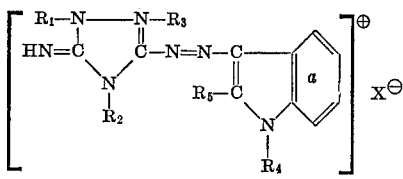

wherein $R_1$ is aryl, $R_2$ and $R_3$ are alkyl or aralkyl, $R_4$ and $R_5$ are hydrogen or unsubstituted or substituted alkyl or aryl, $X^\ominus$ is an anion, and in which the benzene nucleus $a$ may contain non-ionic substituents which dyestuffs are suitable for the dyeing or printing of tannin-treated cellulose fibers, silk, leather or fully synthetic fibers such as acetate rayon, polyamide or acid-modified polyester, especially fibers consisting of polyacrylonitrile or polyvinylidene cyanide, and which give in the majority of cases dyeings with very clear and deep colours and good fastness to light, fulling, cross-dyeing, carbonizing, chlorinating, perspiration, decatizing, steaming, ironing, rubbing and solvents.

---

The present invention provides basic azo dyestuffs and a process for preparing them. It provides, more especially, basic azo dyestuffs free from sulfonic acid or carboxylic acid groups and having the general Formula I

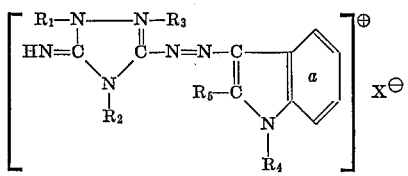 (I)

in which $R_1$ represents an aryl radical, $R_2$ and $R_3$ each represent an alkyl or aralkyl radical, $R_4$ and $R_5$ represent a hydrogen atom, an alkyl or an aryl radical, $X^\ominus$ is an anion and in which the benzene nucleus $a$ may contain non-ionic substituents which possess valuable properties.

The new dyestuffs may be obtained
(a) by treating an azo dyestuff of the general Formula II

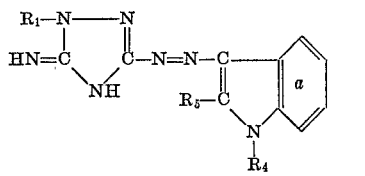 (II)

in which $R_1$, $R_4$, $R_5$ and $a$ have the meanings given above with an alkylating agent which introduces into the dyestuff molecule the radicals $R_2$ and $R_3$ and the anion $X^\ominus$, or
(b) by coupling a diazonium compound of a quaternary amine of the general Formula III

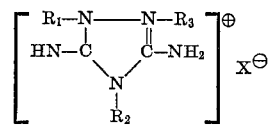 (III)

in which $R_1$, $R_2$, $R_3$ and $X^\ominus$ have the meanings given above with a coupling component having the general Formula IV

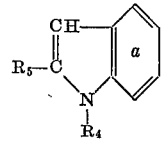 (IV)

in which $R_4$, $R_5$ and $a$ are defined as above.

The method (a) is especially advantageous and can be generally applied. With this method of operation not only quaternation occurs but also, simultaneously, alkylation of the triazoline ring. The alkylation is facilitated by addition of basic compounds, for example sodium carbonate; sodium acetate, calcium oxide, calcium carbonate, sodium bicarbonate, magnesium oxide or magnesium carbonate.

As alkylating agents there may be used the following compounds: alkyl or aralkyl halides, halogeno-acetamides, β-halogeno-propionitriles, halogeno-hydrines, alkyl esters of sulphuric acid or alkyl or aralkyl esters of organic sulphonic acids. Convenient alkylating agents are for example the following: methyl chloride, bromide or iodide, ethyl bromide or ethyl iodide, propyl bromide or propyl iodide, benzyl chloride or benzyl bromide, chloroacetamide, β-chloropropionitrile, ethylene-chlorohydrine, dimethylsulfate, diethylsulfate, benzene-sulfonic acid methyl ester, p-toluene-sulfonic acid-ethyl, propyl or butyl ester.

The reaction according to the present process with the alkylating agents may be effected in inert organic solvents at a temperature within the range from 50° C. to 150° C., the quaternary compounds of the Formula I in many cases precipitating automatically and being separated by simple filtration. As solvents there may be used, for example, aliphatic, cycloaliphatic or aromatic hydrocarbons boiling at temperatures within the range from 50° C. to 150° C., moreover aliphatic or cyclic compounds which contain halogen atoms and are stable under the applied conditions, for example carbon tetrachloride, tetrachloroethane, chloroform, tetrachloroethylene, mono- and dichlorobenzene. Suitable compounds are also nitrohydrocarbons, for example nitrobenzene, ketones, for example, acetone or methylethylketone, carboxylic acid amides for example dimethylformamide or N-methylacetamide, moreover alcohols for example, methanol or ethanol, glycols or glycolalkyl ethers. Usually the choice of suitable solvents depends on the solubility and the chemical composition of the azo dyestuff to be quaternated. In some cases, however, it is advantageous to carry out the reaction in an excess of the alkylating agent. If the quaternated dyestuffs cannot be separated from the solvent by filtration, it is possible to remove the solvents used, for example, by distilling them off, if desired or required, under reduced pressure, or by distilling them with steam. In many cases, however, a simple extraction with warm water of the solvents non-miscible with water is sufficient. The purification of the dyestuffs obtained according to the process of the present invention is advantageously carried out by dissolving them in water, whereupon the dyestuffs initially used which are insoluble in water are separated by filtration. From the aqueous solution, which, if required, is clarified with charcoal, the prepared cationic dyestuffs of the Formula I can either be salted out or isolated in form of their double salts with zinc or cadmium halides.

The azo dyestuffs used as starting materials in the process of method (a) which correspond to the general Formula II may be prepared by a generally known method, for example by coupling diazotised 3-amino-1-aryl-5-imino-4,5-dihydro-1,2,4-triazoles of the general formula

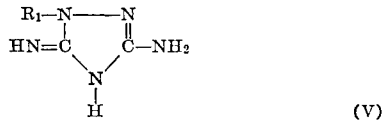
(V)

with coupling components of Formula IV.

As 3-amino-1-aryl-5-imino - 4,5-dihydro-1,2,4-triazoles of Formula V there are used, for example the 1-phenyl or 1- or 2-naphthyl compounds thereof, which may contain, if desired, in the aryl radical one or more non-ionic substituents, for example halogen atoms, alkyl, aralkyl, alkoxy, nitro, alkylsulphonyl, arylsulphonyl, acylamino or trifluoromethyl groups. As coupling components of Formula IV there are used, according to the present process, indole, moreover 2-alkylindoles, 2-arylindoles, 1,2-dialkylindoles, 1-alkyl-2-arylindoles or 1-alkylindoles, the alkyl or aryl radicals thereof as well as the benzene nucleus $a$ may further contain non-ionic substituents.

The quaternary amines of Formula III used according to method (b) may be prepared by treatment of amines of Formula V with alkylating agents for example, alkyl or aralkyl halides, or alkyl or aralkyl esters of sulphuric acid or of organic sulphonic acids, advantageously in organic solvents.

The diazotation of the amines of the Formula III is carried out according to known methods, for example by means of hydrochloric acid and sodium nitrite. The coupling with the coupling components of Formula IV is also effected by a known method, for example in a neutral or acid medium, if desired or required, in the presence of buffer substances or agents accelerating the coupling, for example pyridine.

The dyestuffs obtained according to the process of the present invention, which correspond to the Formula I contain as anion $X^-$, preferably the radical of a strong acid, for example the radical of sulphuric acid or of the semi-esters thereof, of an arylsulphonic acid or of a hydrohalic acid. These anions used for the present process may be replaced by the anions of other acids, for example of phosphoric acid, acetic acid, oxalic acid, lactic acid or tartaric acid.

The dyestuffs of the present invention are suitable for the dyeing or printing of tannin-treated cellulose fibres, silk, leather or fully synthetic fibres, for example acetate rayon, or polyamide fibres, or acid-modified polyester fibres especially fibres consisting of polyacrylonitrile or polyvinylidene cyanide. In the majority of cases the dyeings produced with the present dyestuffs on these fibres are very clear and deep in colour and have a good fastness to light, fulling, cross-dyeing, carbonizing, chlorinating, perspiration, decatizing, steaming, ironing, rubbing and solvents to solvents.

The dyestuffs of the invention are, in general, largely insensitive toward variations of the pH value of the dyebath. There may thus be applied from both a weakly acidic or strongly acidic bath. Moreover, they are stable at temperatures above 100° C. practised in high-temperature dyeing. Under normal dyeing conditions wool is completely resisted by the dyestuffs.

The following examples are to illustrate the invention but they are not intended to limit it thereto. The parts and percentages are by weight unless otherwise stated.

EXAMPLE 1

To a mixture of 8.8 parts of 3-amino-1-phenyl-5-imino-4,5-dihydro-1,2,4-triazole and 6.5 parts by volume of water 27 parts of sulfuric acid of 96% strength were added with vigorous stirring while the batch warmed to 60–70° C. and a clear solution formed. After cooling the solution to 0–5° C. the amine was diazotized with 7.8 parts by volume of nitrosylsulfuric acid at 5–10° C. The diazotization so obtained was, after 15 minutes, poured on 100 parts of ice and 100 parts of water, whereupon a solution of 6.7 parts of 2-methylindole in 100 parts by volume of ethyl alcohol was allowed to drop in slowly. After about 15 minutes coupling was complete, and the sulfate of the dyestuff which had precipitated as yellow crystals was drawn off, washed with water and two times with 50 parts by volume of methyl alcohol. Then the product was suspended in 200 parts by volume of water, this suspension was adjusted to a pH value between 8–9 by means of sodium hydroxide solution and, after complete decomposition of the sulfate, the free colour base was drawn off, washed neutral with water and dried at 60° C. About 15 parts of the dyestuff having the formula

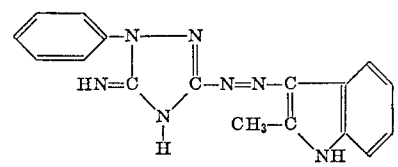

were obtained in the form of brownish yellow crystalline powder. For the conversion into the quaternary compound 10 parts by volume of dimethyl sulfate were added within 15 minutes to a mixture of 90° C. consisting of 15 parts of the above dyestuff, 4 parts of magnesium oxide and 500 parts by volume of chlorobenzene, and the whole was stirred at this temperature for about 15 hours until quaternization was complete. Thereafter, the crystals which had precipitated were drawn off while hot, washed with 500 parts by volume of chlorobenzene and dried at 65° C. 27 parts of the dyestuff of the formula

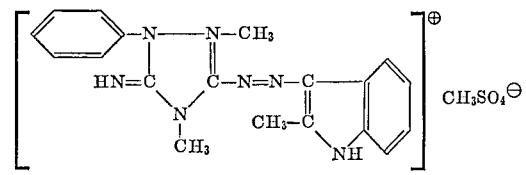

were obtained in the form of brownish yellow crystalline powder that dissolved in water producing a yellow colour. To prepare the dyeings 1 g. of the dyestuff thus obtained was mixed by stirring with 2.5 g. acetic acid of 50% strength and dissolved in 6 l. of water.

Furthermore, 1 g. of crystalline sodium acetate and 10 g. of calcined Glauber's salt were admixed in the dyebath. Then 100 g. of washed yarn consisting of polyacrylonitrile staple fibres were introduced therein, while the temperature of dyebath was 60° C., the temperature was slowly raised to 100° C. and the yarn dyed for one hour at the boil. Subsequently, the bath was allowed to cool slowly to about 60° C., whereupon the yarn was rinsed and dried. A clear yellow shade was obtained which showed very good fastness to light and wet processing.

EXAMPLE 2

When replacing at the quaternization reaction according to Example 1 the dimethylsulfate by 15 parts of diethyl sulfate and stirring the batch at 90–100° C. until quaternization was complete, about 15 parts of the dyestuff of the formula

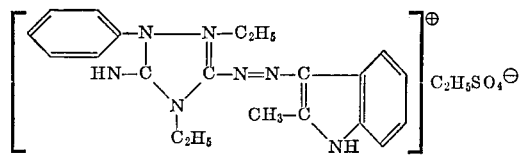

were obtained in the form of a brownish yellow crystalline powder which dissolved in hot water producing a yellow colour. By salting out the hot aqueous dyestuff solution with sodium chloride or zinc chloride the chloride or chlorozincate of the dyestuff was obtained.

EXAMPLE 3

10 parts of the dyestuff having the formulae

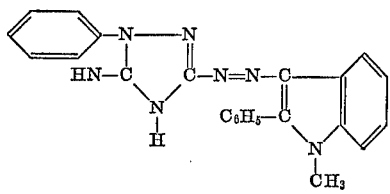

prepared according to Example 1 from 8.8 parts of 3-amino - 1 - phenyl - 5 - imino-4,5-dihydro-1,2,4-triazole and 10 parts of 1-methyl-2-phenylindole and 10 parts of anhydrous sodium carbonate were freed from water by azeotropic distillation in 500 parts by volume of chlorobenzene and subsequently stirred for about 5 hours, with 10 parts by volume of dimethylsulfate at 100° C. The yellow-brown precipitate obtained on completion of the quaternization was sucked off, washed with hot toluene and dried. About 31 parts of the dyestuff of the formula

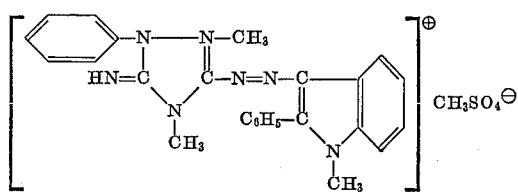

were obtained in the form of yellow-brown crystals soluble in hot water.

For the preparation of dyeings 1 g. of the dyestuff thus obtained was mixed by stirring with 2 g. of acetic acid of 50% strength and dissolved in 5 l. of water. To the dyebath 1 g. of crystalline sodium acetate and 10 g. of calcined sodium sulfate were admixed. Then 100 g. of washed textiles consisting of acid-modified polyester fibres were introduced at 60° C., the temperature of the bath was slowly raised and the goods were dyed for one hour at 120° C. Subsequently, the whole was cooled to 70° C., and the dyeing was rinsed and dried. A reddish yellow dyeing was obtained of good fastness to light and very good fastness to wet processing.

The following table lists further dyestuffs obtainable according to the instant process which correspond to Formula I, as well as the shades produced with these dyestuffs on polyacrylonitrile fibre.

We claim:

1. A basic azo dyestuff free from sulfonic acid and carboxylic acid groups having the formula

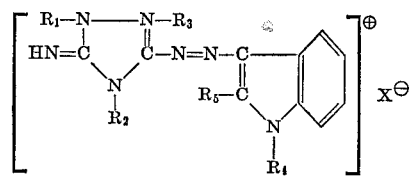

wherein $R_1$ represents phenyl, chlorophenyl, nitrophenyl, lower alkyl-phenyl, lower alkoxy-phenyl or naphthyl, $R_2$ and $R_3$ each represent lower alkyl, $R_4$ and $R_5$ each represent hydrogen, lower alkyl, or phenyl, and $X^\ominus$ represents an anion.

2. The basic azo dyestuff having the formula

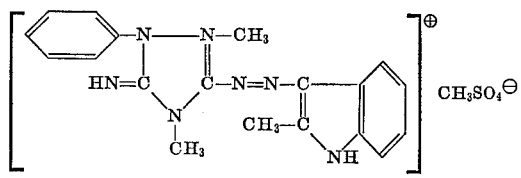

3. The basic azo dyestuff having the formula

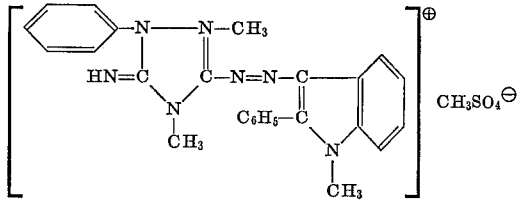

4. The basic azo dyestuff having the formula

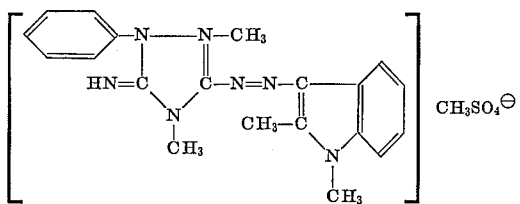

5. The basic azo dyestuff having the formula

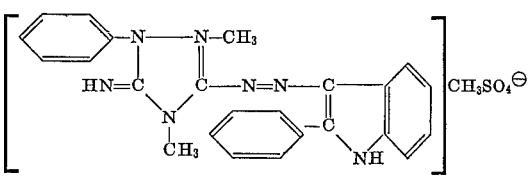

| $R_1$ | $R_2$ | $R_3$ | $R_4$ | $R_5$ | X | Shade on polyacrylonitrile |
|---|---|---|---|---|---|---|
| Phenyl | Methyl | Methyl | Methyl | Methyl | CH₃SO₄ | Yellow. |
| Do | do | do | Hydrogen | Phenyl | CH₃SO₄ | Do. |
| 4-methylphenyl | do | do | Methyl | do | CH₃SO₄ | Do. |
| Do | do | do | do | Methyl | CH₃SO₄ | Do. |
| Do | do | do | Hydrogen | do | CH₃SO₄ | Do. |
| 3-nitrophenyl | do | do | do | do | CH₃SO₄ | Do. |
| Do | do | do | Methyl | Phenyl | CH₃SO₄ | Do. |
| 4-chlorophenyl | do | do | do | do | CH₃SO₄ | Do. |
| Do | do | do | Hydrogen | Methyl | CH₃SO₄ | Do. |
| 1-naphthyl | do | do | do | do | CH₃SO₄ | Do. |
| Do | do | do | Methyl | Phenyl | CH₃SO₄ | Do. |
| 2-naphthyl | do | do | Hydrogen | Methyl | CH₃SO₄ | Do. |
| Do | do | do | Methyl | Phenyl | CH₃SO₄ | Do. |
| 4-methoxyphenyl | do | do | Hydrogen | Methyl | ZnCl₃ | Do. |
| Do | do | do | Methyl | do | CH₃SO₄ | Do. |
| Phenyl | do | do | β-Cyanoethyl | do | CH₃SO₄ | Do. |
| Do | do | do | do | Phenyl | CH₃SO₄ | Do. |
| Do | do | do | Hydrogen | Hydrogen | Cl | Do. |

6. The basic azo dyestuff having the formula
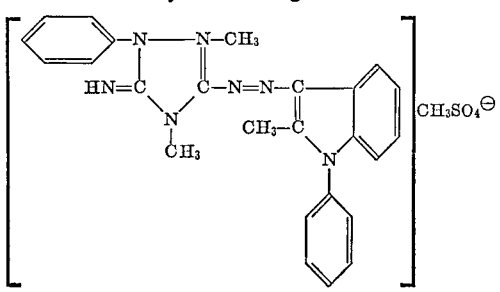
References Cited
UNITED STATES PATENTS
| | | | |
|---|---|---|---|
| 2,883,373 | 4/1959 | Bossard et al. | 260—157 X |
| 3,148,935 | 9/1964 | Pfitzner et al. | 260—157 X |
| 3,255,173 | 6/1966 | Dehnert et al. | 260—157 X |
| 3,423,392 | 1/1969 | Wunderlich et al. | 260—157 X |
| 3,438,963 | 4/1969 | Robbins | 260—157 |
FLOYD D. HIGEL, Primary Examiner
U.S. Cl. X.R.
8—4, 13, 41 R, 41 A, 41 B, 41 C, 50; 117—138.8 R, 138.8 E, 138.8 A, 143; 260—37 R, 37 N, 40 R, 41 R, 308 R, 308 C, 319.1